(12) United States Patent
Welker

(10) Patent No.: US 7,391,674 B2
(45) Date of Patent: Jun. 24, 2008

(54) METHODS AND SYSTEMS FOR DETERMINING ORIENTATION OF SEISMIC CABLE APPARATUS

(75) Inventor: Kenneth E. Welker, Nesoya (NO)

(73) Assignee: Western Geco L.L.C., Houston, TX (US)

( * ) Notice: Subject to any disclaimer, the term of this patent is extended or adjusted under 35 U.S.C. 154(b) by 0 days.

(21) Appl. No.: 11/460,132

(22) Filed: Jul. 26, 2006

(65) Prior Publication Data
US 2008/0025146 A1    Jan. 31, 2008

(51) Int. Cl.
*G01V 1/20* (2006.01)
(52) U.S. Cl. .............................. 367/19; 367/58; 367/120
(58) Field of Classification Search .................... 367/19, 367/58, 120
See application file for complete search history.

(56) References Cited

U.S. PATENT DOCUMENTS

| | | | | |
|---|---|---|---|---|
| 3,953,827 | A * | 4/1976 | Le Moal et al. ................ | 367/19 |
| 4,068,208 | A * | 1/1978 | Rice et al. ...................... | 367/19 |
| 4,648,082 | A | 3/1987 | Savit | |
| 4,862,422 | A * | 8/1989 | Brac ............................ | 367/19 |
| 4,870,626 | A * | 9/1989 | Tveit ........................... | 367/130 |
| 4,912,682 | A * | 3/1990 | Norton et al. .................. | 367/19 |
| 5,031,159 | A * | 7/1991 | Rouquette ..................... | 367/125 |
| 5,166,905 | A * | 11/1992 | Currie ......................... | 367/19 |
| 5,668,775 | A * | 9/1997 | Hatteland ..................... | 367/19 |
| 5,696,733 | A * | 12/1997 | Zinn et al. ..................... | 367/19 |
| 5,757,722 | A * | 5/1998 | Zinn ........................... | 367/19 |
| 5,761,153 | A * | 6/1998 | Gikas et al. ................... | 367/19 |
| 6,009,042 | A | 12/1999 | Workman et al. | |

(Continued)

OTHER PUBLICATIONS

Watson et al. Ultra-Short Baseline Acoustic Tracking System. Oceans. vol. 15. pp. 214-218. Aug. 1983.*

(Continued)

*Primary Examiner*—Deandra M Hughes
(74) *Attorney, Agent, or Firm*—Jeffrey L. Wendt; Liangang (Mark) Ye; Jeffrey E. Griffin

(57) ABSTRACT

Methods and systems for estimating one or more orientation parameters of a seismic apparatus are described. One method comprises initiating an acoustic signal from an acoustic transmitter in a marine seismic spread comprising a streamer, the streamer having at least two nodes separated by a fixed distance; measuring a first and a second difference in acoustic arrival times at the nodes for the acoustic signal; and using change in the second difference from the first difference to estimate orientation of the streamer. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

20 Claims, 4 Drawing Sheets

U.S. PATENT DOCUMENTS

| | | | | |
|---|---|---|---|---|
| 6,028,822 | A * | 2/2000 | Lansley et al. | 367/62 |
| 6,366,532 | B1 * | 4/2002 | Hoepken | 367/127 |
| 6,570,817 | B2 * | 5/2003 | Hoepken | 367/124 |
| 6,618,321 | B2 * | 9/2003 | Brunet | 367/19 |
| 6,697,300 | B1 * | 2/2004 | Holt | 367/127 |
| 6,747,913 | B2 * | 6/2004 | Fokkema et al. | 367/24 |
| 6,932,017 | B1 | 8/2005 | Hillesund et al. | |
| 7,050,355 | B2 * | 5/2006 | Robertsson et al. | 367/19 |
| 7,203,130 | B1 * | 4/2007 | Welker | 367/16 |
| 2006/0215489 | A1 * | 9/2006 | Solheim et al. | 367/20 |
| 2006/0239122 | A1 * | 10/2006 | Vigen et al. | 367/131 |
| 2006/0285434 | A1 * | 12/2006 | Welker et al. | 367/19 |
| 2007/0091719 | A1 * | 4/2007 | Falkenberg et al. | 367/19 |
| 2007/0223308 | A1 * | 9/2007 | Frivik et al. | 367/19 |
| 2007/0230268 | A1 * | 10/2007 | Hoogeveen et al. | 367/19 |

OTHER PUBLICATIONS

Smith, S.M. and Kronen, D. Experimental Results of an Inexpensive Short Baseline Acoustic Positioning System for AUV Navigation. IEEE. 1997.*

Dowling, "The dynamics of towed flexible cylinders Part I, Neutrally buoyant elements," *J. Fluid Mech.*, 187:507-532, 1988.

Dowling, "The dynamics of towed flexible cylinders Part II. Negatively buoyant elements," *J. Fluid Mech.*, 187:533-571, 1988.

Tritton, *Physical Fluid Dynamics*, 2nd Ed., Oxford University Press, Ch. 13, pp. 153-161, 1988.

* cited by examiner

METHODS AND SYSTEMS FOR DETERMINING ORIENTATION OF SEISMIC CABLE APPARATUS

BACKGROUND OF THE INVENTION

1. Field of Invention

The present invention relates to the field of seismic data acquisition systems and methods of using same. More specifically, the invention relates to methods and systems for determining one or more orientation parameters of nodes in or attached to seismic cable apparatus, such as seismic streamer and seabed seismic cables.

2. Related Art

Marine seismic exploration investigates and maps the structure and character of subsurface geological formations underlying a body of water. For large survey areas, a seismic spread may have vessels towing multiple seismic streamer cables through the water, and one or more seismic sources by the same or different vessel. The seismic sources typically comprise compressed air guns for generating acoustic pulses in the water. The energy from these pulses propagates downwardly into the geological formations and is reflected upwardly from the interfaces between subsurface geological formations. The reflected energy is sensed with seismic instruments attached to or internal of the seismic streamer cables, and data representing such energy is recorded and processed to provide information about the underlying geological features. So-called "ghost" signals, which reflect off of the surface of the water, may be problematic. Typically, it is necessary to "de-ghost" seismic signals received by seismic instruments. Seismic data may also be acquired using one or more so-called seabed seismic cables, and on land using a variety of seismic techniques. While this discussion focuses on art related to towed streamer seismic data collection, the invention is not so limited.

The orientation of seismic receivers is critical for the purpose of de-ghosting using multiple seismic instruments. Ghost signals may be separated from the directly reflected seismic signal if the ghost signal is recorded by two or more seismic instruments in seismic streamer cables with known fixed separation. Unfortunately, due to seismic streamer cable rotation, snaking and other irregularities, the distance between any two seismic instruments in a streamer are almost constantly changing. Accelerometers may be used for measuring streamer cable rotation, but accelerometers are subject to drift, add weight to the streamer, and are therefore not ideal. An alternate method of measuring orientation of seismic cable apparatus would be beneficial to the de-ghosting effort. The methods and systems of the present invention address this problem, as well as providing other advantages in certain embodiments.

SUMMARY OF THE INVENTION

In accordance with the present invention, methods and systems for determining one or more orientation parameters of a seismic cable apparatus or system are described. As used herein the phrase "orientation parameter" includes, but is not limited to rotational movement or change in position, relative inline local directional heading, and the like. As used herein the "seismic cable apparatus or system" includes seismic streamers and seismic seabed cables, as well as "streamer-related" items such as streamer section connectors, sensors in or on the streamers, connectors between streamers (for example connectors facilitating so-called over/under streamer arrangements, as described in our co-pending application serial number 11/055,481, filed Feb. 10, 2005, incorporated by reference herein), "positioning streamers" as described in our co-pending application serial number 11/086,030, filed Mar. 22, 2005, incorporated by reference herein, streamer deflectors, separation cables, steerable and non-steerable tail buoys, and the like, including control surfaces and bodies of such devices, and one or more instruments integral with or attached to any of these, such as hydrophones, GPS receivers, compasses, inertial measuring devices, and the like. In certain embodiments, methods and systems of the invention may be used to estimate rotation and/or directional heading of a marine seismic streamer cable, or rotational movement of a seabed seismic cable. In certain embodiments, other information may be obtained as well, such as local sound velocity in the vicinity of a seismic cable apparatus. The methods and systems of the invention reduce or overcome problems using accelerometers, and may increase the ability to de-ghost reflected seismic signals received by seismic instruments attached to or within seismic streamer cables. Methods and systems of the invention may be used to collect marine seismic data, for example 3-D and 4-D marine seismic data, while allowing improved ghost separation from directly reflected seismic signals. The invention provides methods and systems for determining one or more orientation parameters, and optionally other parameters, of a seismic cable apparatus by analysis of one or more acoustic signals. Other signals, such as electromagnetic (EM) signals, may be used to transfer data to and/or from the acoustic transmitter, to transmit power, and/or to receive instructions to operate equipment. The acoustic signal impinges upon the seismic cable apparatus, or portions thereof. In certain embodiments the impinged signals may be received and transmitted to a calculation unit by a signal receiver apparatus, and in other embodiments the signals may be reflected or otherwise directed to other apparatus able to interpret the reflected signals.

A first aspect of the invention comprises methods, one method comprising:

a) initiating an acoustic signal from a transmitter, the signal impinging upon at least two nodes on or in one or more seismic cable apparatus, the nodes separated by a fixed distance;

b) measuring a first and a second difference in arrival times at the nodes for the signal; and c) using change in the second difference from the first difference to estimate one or more orientation parameters of at least a portion of the seismic cable apparatus.

As used herein the term "node" is used generically to denote a component able to detect a signal, or to be detected remotely by a signal impinging on it and being reflected to another device. Methods of the invention include those wherein the signal comprises a wavelength shorter than the fixed distance between the two nodes, which may be two seismic instruments, such as hydrophones. Certain methods of the invention are those wherein the estimate of the at least one orientation parameter comprises measuring orientation of a seismic streamer, the method comprising estimating parameters selected from an angle of rotation of the streamer, inline heading of a streamer, and the like. Methods of the invention include those wherein the signal is an acoustic signal initiated from within a seismic spread, wherein the marine seismic spread comprises one or a plurality of streamers, and each streamer may have a plurality of seismic instruments, such as hydrophones, therein or attached thereto. Three or more seismic instruments may exist in a seismic instrument plane that is substantially vertical and perpendicular to a longitudinal axis of the seismic cable apparatus. The angle of rotation may be in a plane defined by three or more seismic cable apparatus. Certain methods of the invention may use one or more signals recorded at orthogonally situated seismic instruments to estimate orientation of the seismic cable apparatus. Differences in phase measured at the seismic cable apparatus provide their relation to one another with regard to orientation of the plane they sit in. Since the fixed distance between nodes is known, orientation parameters may be estimated. Further, more precise distance measurements and signal propagation rates may be possible using high-frequency signals, which may be measured with multiple instruments. High-frequency signals (e.g., wavelengths smaller than the distance between nodes) provide phase differences with higher resolution than lower-frequency acoustic signals. Continuous cycle counting and phase tracking may be employed to measure small orientation changes. For example, techniques common to tracking position relationship of GPS satellites and receivers may be employed. In certain methods, integer ambiguity resolution in GPS comprises making a first good estimate of relation between transmitters (GPS satellites) and receivers. The phase of the carrier signal is tracked and a search performed of a volume within which the receiver probably is located. Typically there are a number of locations within the volume where the partial waves could fit together, and the method evaluates the most likely location of this set. This then is used as a starting place for relative change. Successive events of phase tracking lead to more and more certainty for which of the set is the most likely one. In some embodiments, use of a large number of measurements may ensure high resolution and accuracy in the determination of cycle ambiguity.

Yet other methods of the invention include estimating relative inline local heading of a seismic cable apparatus, for example a seismic streamer cable. An estimate of an inline local heading may be obtained as long as there is a fixed distance separation between nodes parallel to the seismic apparatus. Both the shape and absolute bearing with respect to a fixed reference frame are useful for seismic hydrophone positioning. Acoustic signal recordings at nodes such as hydrophones or other receivers rigidly aligned with an inline axis of a seismic cable apparatus may provide a local apparatus heading at their locale, and these local headings may optionally be interpolated using some assumed shape between these locales to give a better estimation of shape of a seismic cable apparatus, such as a streamer cable, that may be available today. These headings may be related to an absolute reference when the nodes aligned with the inline axis of the seismic cable apparatus are positioned in an acoustic network with a reference to an absolute reference frame, the GPS reference frame WGS-84 for example. If the axis between two inline nodes, integral to the seismic cable apparatus, is rigid, a further use for these two nodes capable of recording a signal is to determine the local sound velocity propagation over the distance separating the two nodes.

Exemplary methods of the invention comprise multiple acoustic transmitters transmitting acoustic signals. In certain methods of the invention the difference in acoustic arrival times at two acoustic receivers on a seismic cable apparatus may be combined with monitoring of acoustic signal phase change. This combination may provide the orientation of a plane containing the receivers when the relative positions of receivers in the plane are known, as it is an ultra-short baseline acoustic system. In yet other methods of the invention, the earth-based positions of the transmitters, the seismic cable apparatus or portions thereof may be determined from trilateration in reference to satellite receiver control points spaced regularly or randomly as desired in the spread to make an insea network. Estimating of seismic cable apparatus orientation (rotation, inline heading, and the like) may be performed by a calculation performed by a computer and one or more software algorithms. Optionally, streamer parameters and characteristics of streamer steering devices, such as force exerted by wings of steerable birds having one or more wings, may be used in the calculation. As used herein the phrase "streamer parameters" includes, but is not limited to, tension in the streamer, the angle of incidence of the streamer to the flow direction, streamer relative water speed, streamer diameter, streamer density, and the like. Methods of the invention include those wherein at least one seismic cable apparatus position, or a node thereon, is known, and the position of a neighboring seismic cable apparatus, or neighboring node, is estimated. The estimation of position of at least a portion of a seismic cable apparatus, such as a section of a seismic streamer cable, may include use of the equations of motion, and may include other information and/or calculations and algorithms. Other methods of the invention may employ nodes integrated into a seismic streamer cable and/or other seismic devices, and using the estimate as an inline orientation (heading) estimate.

A second aspect of the invention are systems for carrying out the inventive methods, one system comprising:

a) two or more nodes separated by a fixed distance in a seismic cable apparatus;

b) a transmitter emitting an acoustic signal;

c) a measuring unit for measuring a first and a second difference in arrival times at the nodes for the signal; and d) a calculation unit using change in the second difference from the first difference to estimate one or more orientation parameters of at least a portion of the seismic cable apparatus.

Systems of the invention include those wherein the transmitter is an acoustic transmitter that emits an acoustic signal having a wavelength shorter than the fixed distance between the nodes. Other systems of the invention include those wherein the calculation unit calculates a parameter selected from an angle of rotation, inline heading, and the like. Systems of the invention include those wherein the measuring unit and calculation unit are combined in one unit, and systems where they are separate units. Systems of the invention may include other sensors, instrumentation, and equipment such as temperature sensors, pressure sensors, depth sensors, salinity sensors, inertial sensors such as accelerometers, acoustic positioning instrumentation (transmitters, receivers, and/or transceivers), steering devices, connectors and the like. A transceiver is a dual functioning unit that both transmits and receives acoustic signals. Systems of the invention may also utilize buoy-mounted transmitters and/or receivers wherein the buoys are tethered to something other than seismic cable apparatus, such as a buoy anchored in a channel.

Systems of the invention may include satellite-based global positioning control points (satellite receivers) spaced as desired, either regularly or randomly spaced. The satellite receivers may be stationed on floatation devices, for example buoys, tethered to a streamer. A satellite receiver may be stationed near a quarter point between a midpoint and a tail of one or more seismic streamers. It is also within the invention to station a satellite receiver near a quarter point between the midpoint of the seismic streamer and the towing vessel. As with acoustic transmitters and receivers, the invention contemplates usage of buoy-mounted satellite receivers in conjunction with one or more streamer mounted satellite receiver, wherein some of the buoys are not attached to any spread element, but anchored to some other location.

Systems of the invention include those systems wherein the seismic cable apparatus are seismic streamers positioned in over/under arrangement, with or without rigid or semi-rigid connectors, or offset horizontally. It is not necessary that streamers follow any defined path or trajectory, as long as it is possible for the nodes to receive the signal emitted from the transmitter to calculate arrival time differences and use this information in calculating one or more orientation parameters. Systems of the invention may comprise inertial positioning components, which may supplement the inventive systems in embodiments when satellite communication is blocked or unavailable. Systems of the invention may include means for communicating positions of seismic cable apparatus to a vessel or other information repository or controller (such as steering device controllers) requiring the information.

Methods and systems of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romantic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

Figure 1:
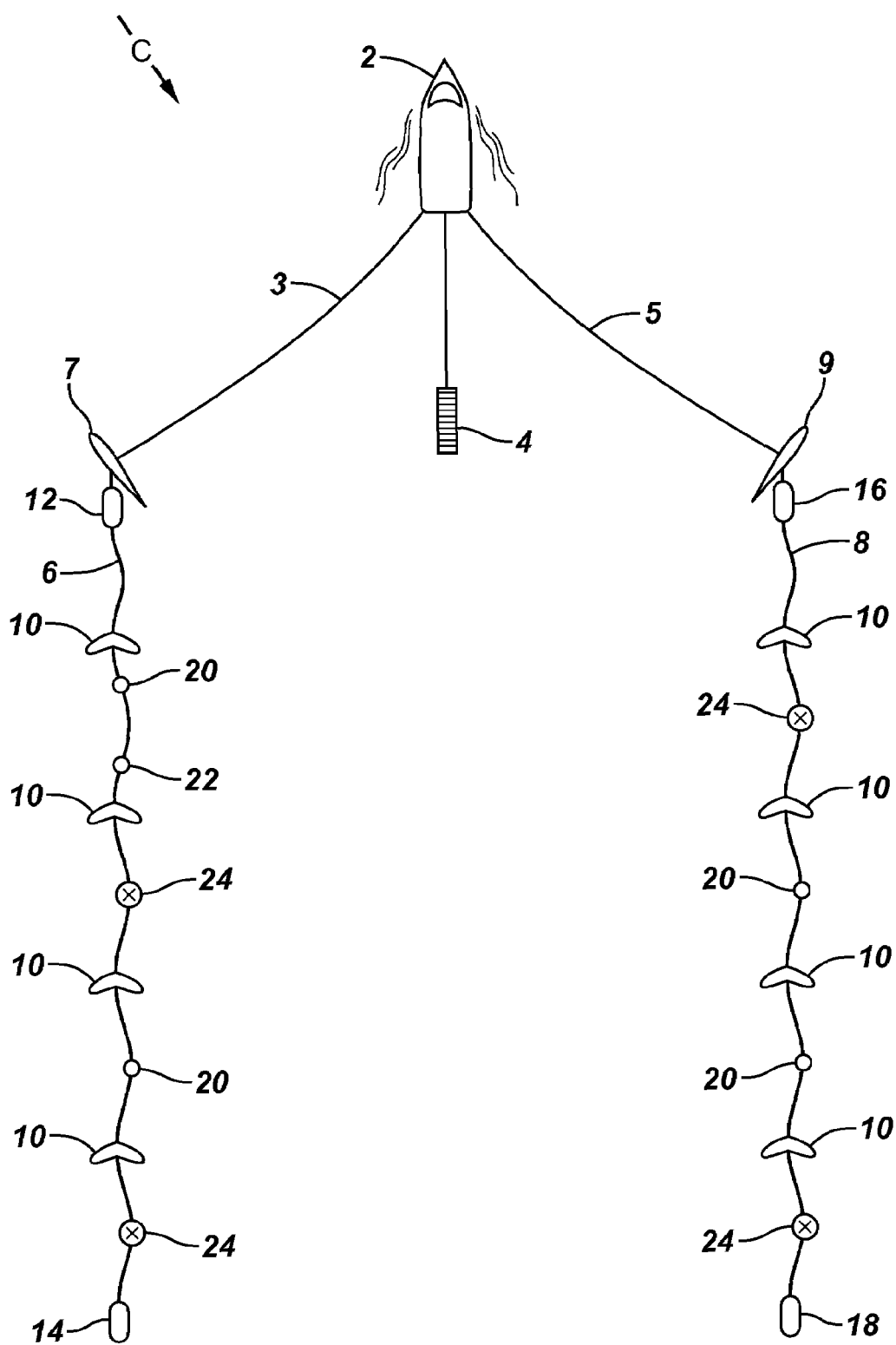
FIG. 1 illustrates a simplified schematic plan view of a towed streamer seismic spread that may benefit from the methods and systems of the invention.

As illustrated schematically in FIG. 1, in order to perform towed marine seismic surveys, one or more marine seismic streamers 6, 8, each typically several thousand meters long and containing a large number of seismic instruments and associated electronic equipment distributed along its length, is towed at about 5 knots behind a seismic survey vessel 2 using tow cables 3 and 5, which also may tow one or more seismic sources 4 comprising source members, typically air guns. Streamers 6 and 8 may be outer-most streamers of a greater number of streamers than depicted in FIG. 1, and then might be diverted by streamer diverters 7 and 9. Acoustic signals produced by seismic sources 4 are directed down through the water into the earth beneath, where they are reflected from the various strata. The reflected signals may be received by numerous acoustic receivers (seismic instruments) in the streamers, as indicated at 20, digitized and then transmitted to the seismic survey vessel, where they may be recorded and at least partially processed with the ultimate aim of building up a representation of the earth strata in the area being surveyed. In recent years, seismic streamers have included acoustic ranging systems, wherein acoustic transmitters and receivers (or transducers performing both functions of transmitting and/or receiving) are stationed strategically in the streamers and dedicated to determining position of the streamers. Satellite receivers stationed at the tow vessel and the end of the streamers on buoys 12, 14, 16, and 18 help determine the earth-oriented position.

As mentioned, ghost signals may be problematic in towed streamer marine seismic surveying, and de-ghosting is necessary. The orientation of a seismic streamer cable is critical for the purpose of de-ghosting using multiple seismic instruments. Ghost signals may be separated from the directly reflected seismic signal if the ghost signal is recorded by two or more seismic instruments in seismic streamer cables with known fixed separation distance. Unfortunately, a current indicated by arrow C tries to force streamers off the path intended by the survey operators, and numerous steering devices 10 may be used to keep the streamers close to their intended paths. In an effort to correct for the current C and other natural forces exerted on the streamers, streamer steering devices 10 may be employed. Unfortunately, the steamer then assumes a shape that is bowed between steering members 10, and steering efforts by streamer steering devices 10 may cause seismic streamer cables 6 and 8 to rotate about their longitudinal axis, perhaps first in one rotational direction, and then in the opposite rotational direction, in a kind of torsion spring fashion. Therefore, in reality the positions of seismic instruments in a streamer are almost constantly changing, increasing the difficulty of de-ghosting the seismic signals. Accelerometers may be used for measuring streamer cable rotation, but accelerometers are subject to drift, requiring recalibration, add weight to the streamer, and are therefore not ideal. Similar cable rotation problems may be experienced by seabed seismic cables.

In accordance with the present invention, methods and systems for determining one or more orientation parameters of a seismic cable apparatus are described. The methods and systems of the invention reduce or overcome problems using accelerometers, and may increase the ability to de-ghost reflected seismic signals received by seismic instruments attached to or within seismic streamer cables, although the invention is not so limited, and may be employed in conjunction with seabed seismic methods using seabed cables. Methods and systems of the invention may be used to collect towed streamer marine seismic data, for example 3-D and 4-D marine seismic data, while allowing improved ghost separation from directly reflected seismic signals. The invention provides methods and systems for determining the orientation of seismic instruments such as seismic streamer cables and/or instruments contained within or on the cable using one or more acoustic signal transmissions and analysis of the difference in arrival times of the signals at the streamer cable and/or instruments on or in the cable. In certain embodiments, the signals may be short wavelength (high-frequency) relative to the separation distance between the seismic instruments. Differences in phase measured at the seismic instruments give their relation to one another with regard to orientation of the plane they sit in. Since the distance between and relative orientation of the seismic instruments is known, cable orientation may be determined. More precise distance measurements and propagation rates are possible since the acoustic signals may be measured with multiple seismic instruments. High-frequency signals (e.g., wavelengths smaller than the distance between nodes) may be useful to provide phase difference with high resolution, and continuous cycle counting and phase tracking may be employed to provide small orientation changes. In certain methods and systems of the invention, a large number of measurements may ensure high resolution and accuracy in the determination of cycle ambiguity. Illustrated in FIG. 1 are one or more acoustic transmitters 24 attached to streamers 6, 8. Transmitters 24 are illustrated as attached to streamers 6, 8, but this is not a requirement of the invention. Essentially all that is required is that transmitters 24 be able to emit acoustic signals from a position that allows seismic instruments 20 to pick up their signal. Thus, transmitters 24 could, for example, be placed on source 4, or buoys 12, 14, 16, and/or 18.

Figure 2:
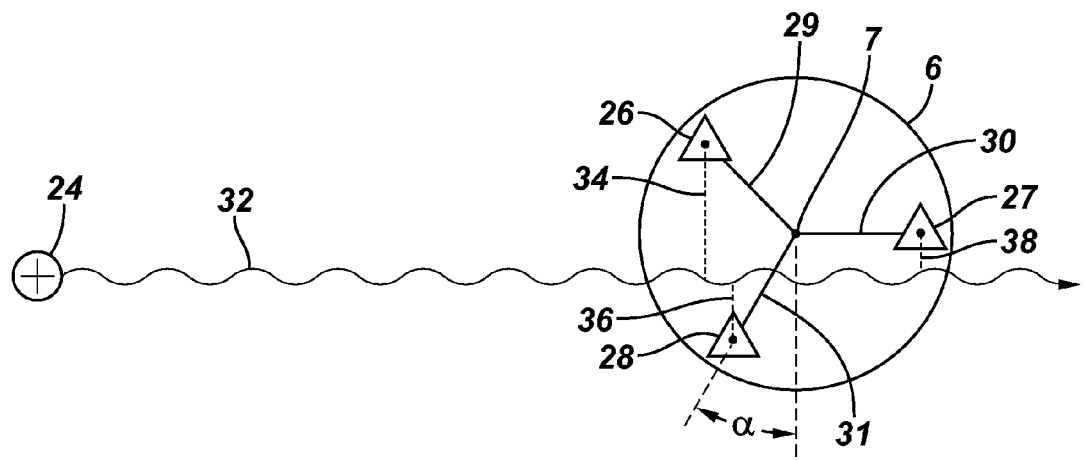
FIGS. 2 and 3 illustrate detailed, highly schematic cross-sectional views of a seismic streamer cable, illustrating methods of the invention.
Figure 3:
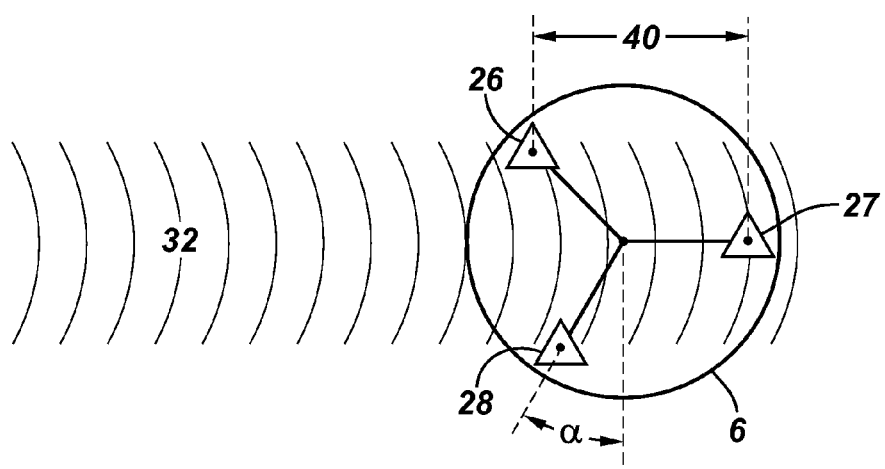
Figure 4:
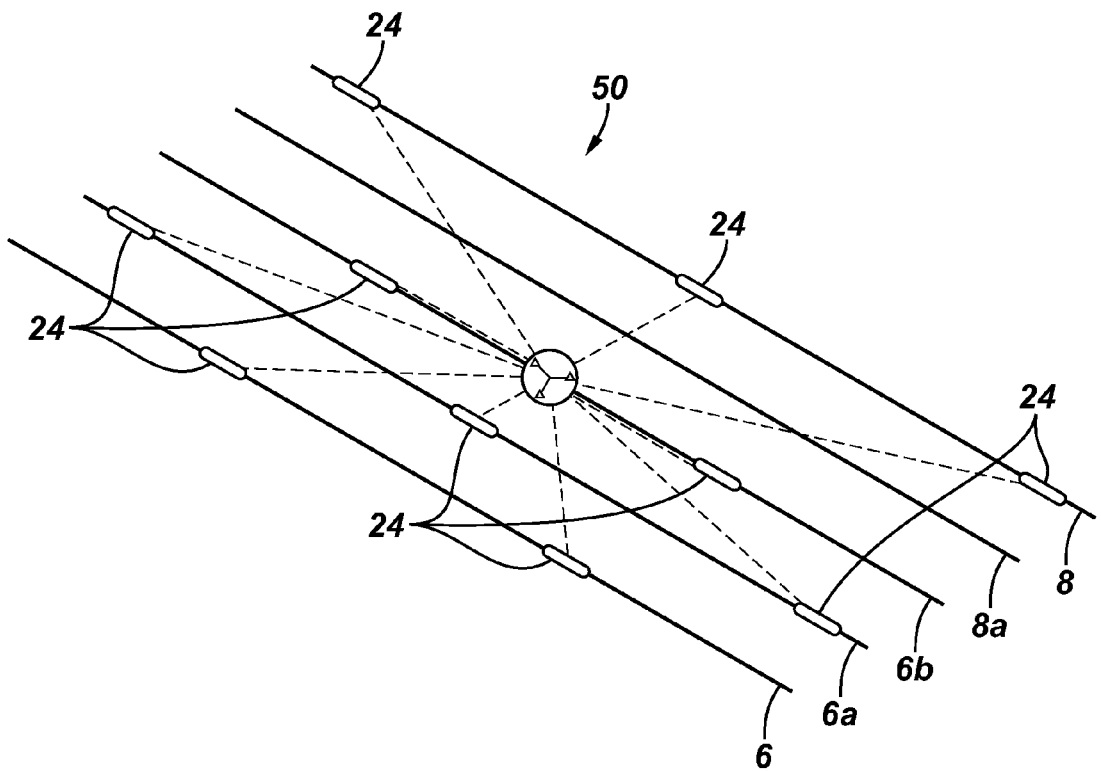
FIG. 4 is a schematic perspective view of a series of seismic streamer cables employing a method of the invention.

FIGS. 2 and 3 illustrate detailed, highly schematic cross-sectional views of a seismic streamer cable, illustrating methods of the invention. FIG. 2 illustrates determining the orientation of a seismic streamer cable 6 and/or the seismic instruments 26, 27, and 28 contained within a streamer cable 6 using an acoustic signal transmission 32 from a transmitter 24. Signal 32 is recorded by instruments 26, 27, and 28 as evidenced by vertical dashed lines 34, 38, and 36, respectively, in other words at orthogonally situated nodes in streamer cable 6 to determine cable orientation, which may be expressed as a rotation angle "$\alpha$" from a vertical axis. Nodes 26, 27, and 28 are electronically connected to data acquisition hardware through electrical connections 29, 30, and 31, respectively. Signal 32 may comprise a short wavelength relative to the separation distance between the nodes. FIG. 3 illustrates an embodiment wherein high-frequency signals 32 (e.g., wavelengths smaller than the distance between nodes) provide phase difference with high resolution, and continuous cycle counting and phase tracking may be employed to provide small orientation changes (small rotation angle, $\alpha$). In certain methods and systems of the invention, such as embodiment 50 illustrated schematically in FIG. 4 having multiple streamers 6, 6a, 6b, 8 and 8a, and a plurality of high-frequency signal transmitters 24, which may be the same or different in terms of signal frequency, a large number of measurements may ensure high resolution and accuracy in the determination of cycle ambiguity.

Figure 5:
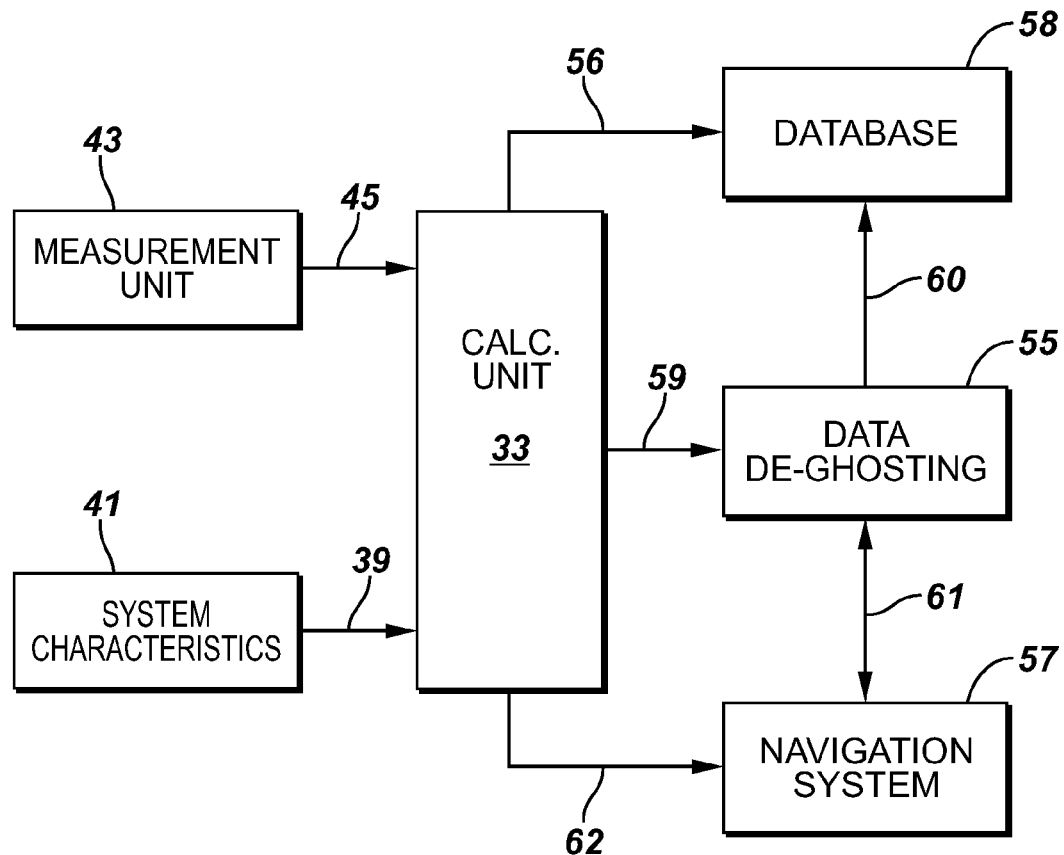
FIG. 5 is a schematic illustration of measurement and calculation units in a system useful in implementing methods of the invention.

FIG. 5 is a schematic illustration of measurement, calculation and other sub-systems of a system useful in implementing methods of the invention. As illustrated in FIG. 5, one or more measurement units 43 supply, via a wire or wireless transmission 45, signal arrival times, signal phase changes, and the like to a calculation unit 33, which may be used to estimate streamer cable rotation and relative positions of nodes in or on a seismic apparatus such as a streamer cable. Seismic system characteristics 41, such as streamer diameter and material of construction, steerable bird wing angles and wing areas, current vector information, GPS coordinates of one or more buoys and nearby receivers, and the like, may optionally be supplied to calculation sub-unit 33 via wire or wireless transmission 39. Calculation unit 33 may include software and hardware allowing the implementation of one or more equations of motion, as well as other algorithms and operations as required, as well as access databases 58, data warehouses and the like, via wire or wireless transmission 56. A data deghosting sub-unit 55 may receive streamer cable rotation and relative positions of seismic instruments in or on the streamer cable, and de-ghost seismic data being received by these seismic instruments. De-ghosted data may be transmitted to database 58, navigation system 57, or other sub-units not illustrated, through wire or wireless transmissions 60, 61, and 62.

Figure 6:
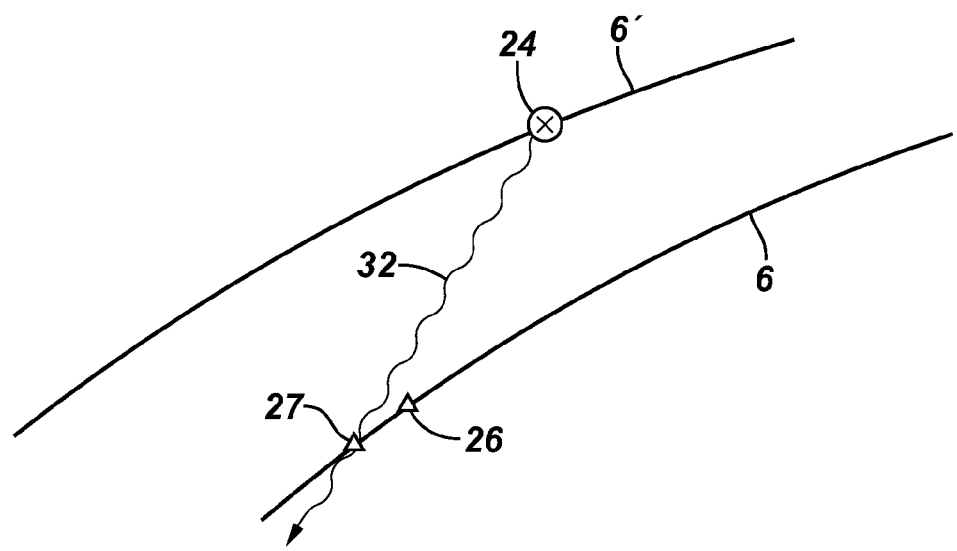

FIG. 6 illustrates schematically another method of the invention, wherein two nodes 26 and 27, which may be seismic hydrophones or other nodes dedicated receivers integrated into or attached to streamer 6, receive an acoustic signal 32. FIG. 6 illustrates determining the orientation of a seismic streamer cable 6 and/or seismic instruments 26, 27 contained within a streamer cable 6 using a signal 32 from an acoustic transmitter 24, which may be on an adjacent streamer 6'. Signal 32 is recorded by nodes 26, 27 as in the embodiment illustrated in FIG. 2, however, nodes 26, 27 need not be orthogonally situated in streamer cable 6 to determine cable orientation. This embodiment may be used to measure inline heading of the streamer cable, and change of distance between nodes 26, 27. Nodes 26, 27 are electronically connected to data acquisition hardware through electrical connections in the streamer cable, as previously indicated, but not illustrated in FIG. 6. This arrangement may also be used to estimate a local streamer heading in the vicinity of nodes 26, 27 by determining X-Y coordinates of nodes 26 and 27. Since they are rigidly separated by a known distance, the local tangent of the streamer or other seismic apparatus may be estimated by taking the arctangent (Dy/Dx), giving local reference frame bearing. A large number of measurements would ensure higher resolution and accuracy in the determination of the relative position of the two nodes. This technique may be used with other seismic cable apparatus as well, such as seabed seismic cables, streamer steering devices, deflectors, streamer connectors, positioning streamers, and the like, as long as a fixed distance between any two nodes on a seismic cable apparatus, or between two nodes on separate seismic cable apparatus, is known.

Figure 7:
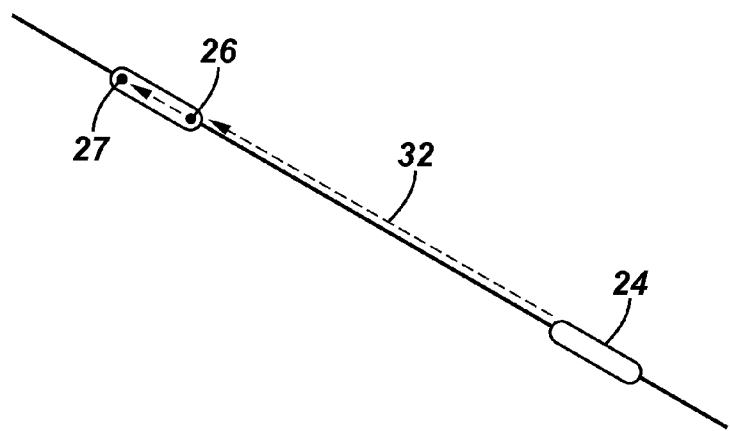
FIGS. 6 and 7 are schematic perspective views of other methods of the invention.

FIG. 7 illustrates yet another method of the invention, wherein sound velocity may be determined directly by time of flight measurements through a seismic cable apparatus, such as a seismic streamer cable 6. The illustrated methods are deemed streamer-integrated or seismic cable apparatus-integrated methods of estimating local sound velocity. An acoustic signal 32 traverses through the streamer until reaching receivers 26 and 27, positioned at a known fixed distance apart through a portion of the streamer.

In certain exemplary embodiments, the ratio of the signal wavelength to fixed distance between nodes may range from 0.1 or less to 0.95, although the invention is not so limited, and the signal may have wavelengths longer than the fixed distance between nodes. In both the short- and long-wavelength embodiments, one or more signal processing techniques may be used, such as digital signal processing, mathematical transforms such as Fourier transforms to generate Fourier transformed data, applying a spatial wavenumber estimation based on a parametric algorithm to the Fourier transformed data, generating a wavenumber spectrum from the parametric algorithm, and using the wavenumber spectrum in one or more calculations. Differences in phase measured at the nodes give their relation to one another with regard to one or more orientation parameters, for example rotation in the plane they sit in. Since the distance between and relative orientation of the nodes is known, one or more orientation parameters may be determined. More precise distance measurements and propagation rates are possible since the signals may be measured with multiple instruments.

Other optional features may be provided with systems of the invention. For example, in cases where the seismic cable apparatus, for example a seismic streamer cable, is slightly heavy (slightly negative buoyancy), and winged streamer steering devices thus need to produce lift to maintain the streamer at the desired depth, this lift may be produced by the flow of the water over the wings of the bird, resulting from the towing speed of the streamer through the water, and can be changed by changing the angle of attack of the wings with respect to the flow. The magnitude of the lift required may depend on seismic instrument positions, and how far the streamer is off of target depth and/or lateral position. If the streamer needs to be moved laterally, the angular position of one wing of the bird may first be adjusted to increase its lift, while the angular position of the other wing is adjusted to decrease its lift, thus causing the bird to roll clockwise or counterclockwise as desired. This roll continues until the bird reaches a steady state condition, where the vertical component of the lift produced by the wings is equal to the lift required to maintain the streamer at the desired depth, while the much larger horizontal component moves the streamer laterally as desired.

While adjusting the angular positions of the wings of the bird, a control circuit may continuously receive signals representative of the actual angular positions of the wings from the stepper motors, as well as a signal representative of the actual roll angle of the bird from an inclinometer, and actual rotation angle of a streamer cable using the methods described herein, to enable the control circuit to determine when the calculated wing angular positions and bird roll angle have been reached. The control circuit may repeatedly recalculate the progressively changing values of the roll angle of the bird, the angular positions of the wings required for the bird and streamer to reach the desired depth and lateral position, and the rotation angle of the streamer cable, until the bird and streamer actually reach the desired depth and lateral position.

The body of steerable birds may or may not rotate with respect to the streamer; if the body does not, it will twists the streamer as it rolls. The streamer resists this twisting motion, so acting as a kind of torsion spring which tends to return the bird to its normal position (i.e. with the wings extending horizontally). However, this spring returning action, though beneficial, is not essential, and the bird can if desired be designed to rotate to a certain extent with respect to the axis of the streamer.

In order to optimize seismic data acquisition, such as during towed streamer marine seismic acquisition and seabed seismic data acquisition, accurate position estimates of seismic receivers are required. For towed streamer seismic data acquisition, force models of the streamers may provide better receiver position estimates by giving more information to calculation units used in previous methods. The direction and speed of the water flow past a streamer, (i.e., current relative to the streamer, and to wings of steering devices) may be determined within a common absolute reference frame, such as the World Geodetic System—1984 (WGS-84). For example, the combined vectors for ocean current and vessel motion give the water flow vector. Estimates of varying precision and accuracy for the streamer orientation exist. The streamer orientation uncertainty is due to at least two model errors; the streamer shape model between the steering devices and the unmodeled misalignment of the steering device relative to the longitudinal streamer axis.

Several methods may be used to advantage to calculate forces on a streamer in the absence of this information. The least precise is to assume the angle of attack of a streamer does not change and use a reasonable value and accept the accompanying error. An improvement on this method is to assume that the streamer is straight. A refinement again is to accept that the streamer is not straight and to use a function that approximates the streamer shape. These methods provide a more precise orientation estimate for the streamer than simply assuming the streamer is straight, however they are still estimates. Rather than using a streamer shape model, the best way to determine forces on a streamer is by measuring one or more characteristics of the steering devices and using this information to calculate the forces the steering devices are exerting on the streamer or portions thereof. This invention describes how to do this through several measurement mechanisms and calculating the forces using the equations of motion.

Knowing the respective wing surface areas, wing shapes, streamer cable rotation angle, and the water flow vector over the wings, one can calculate the forces exerted by the wings, and thus by the steering devices. Tension in the streamer cable may be measured using suitable devices, and the diameter and materials of construction of the streamer are known. It is then possible to calculate the position of a portion of the streamer, such as a seismic instrument, at time $t_1$ relative to a known position of a seismic instrument at time $t_0$ using this information and the equations of motion. Examples of using the equations of motion relative to towed flexible cylinders was addressed by Dowling in at least two articles, which are incorporated by reference herein: Dowling, A. P., "The Dynamics of Towed Flexible Cylinders Part I. Neutrally Buoyant Elements", J. Fluid Mechanics, V. 187, pp 507-532 (1988); and Dowling, A. P., "The Dynamics of Towed Flexible Cylinders Part II. Negatively Buoyant Elements", J. Fluid Mechanics, V. 187, pp 533-571 (1988). Mathematical treatment of wings, including spanning area and lift and drag coefficients, was address by Tritton in 1988: Tritton, D.J., "Physical Fluid Dynamics", Second Ed., Chapter 3, pp 153-161, Oxford Science Publications (1988), which is also incorporated by reference herein.

The initial lateral position of one or more steerable birds in a marine seismic spread that is close to a GPS receiver in the spread may be determined for instance by using GPS alone or combined with an acoustic positioning system, such as a short-baseline (SBL) or ultra-short baseline (USBL) acoustic system. By further using measured arrival times of high-frequency acoustic signals in accordance with the invention, and/or phase changes of the high-frequency acoustic signals, along with characteristics of steering devices and streamer cables, and calculating the forces exerted on the streamer or portions thereof by the steering devices, it is possible to calculate the position of a portion of the streamer, such as an acoustic receiver, at times $t_1, t_2, \ldots, t_n$, at least relative to a known position, as well as rotational angle of the streamer. All receivers in or on a streamer cable, including receivers on birds, and other sensors and portions of a streamer, can this way be tracked for the purpose of deployment precision, increased operational safety, and increased efficiency.

It is within the invention to combine systems of the invention with other position control equipment, such as source array deflecting members, and streamer deflectors. Some of these may include bridle systems, pneumatic systems, hydraulic systems, and combinations thereof. Methods and systems of the invention may also be used to estimate one or more orientation parameters of these apparatus, or portions thereof, such as control surfaces.

In certain embodiments, regardless of the acoustic environment, a higher density of global positioning control points throughout the spread will improve overall accuracy by decreasing the distance between these points and the associated degradation of accuracy.

Other steerable birds useful in the invention include battery-powered steerable birds suspended beneath the streamer and including a pair of laterally projecting wings, the combination of streamers, orientation members (steerable birds) being arranged to be neutrally buoyant. Clamp-on steerable birds, as discussed previously, may also be employed. Steerable birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the steerable bird. The bird on-board controllers may communicate with local controllers mounted on or in other birds, and/or communicate with other local controllers and/or remote controllers, such as a supervisory controller.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. A method of estimating one or more orientation parameters of a marine seismic cable comprising:
   a) initiating an acoustic signal from a signal transmitter in a first seismic cable, the signal impinging upon at least two nodes on or in one or more second seismic cable, the nodes separated by a fixed distance;
   b) measuring a first and a second difference in arrival times at the nodes for the signal; and
   c) using change in the second difference from the first difference to estimate one or more orientation parameters of at least a portion of the second seismic cable.

2. The method of claim 1 wherein the signal comprises a wavelength shorter than the fixed distance between the two nodes.

3. The method of claim 1 wherein the estimate of one or more orientation parameters comprises estimating parameters selected from an angle of rotation, inline heading, local sound velocity, and any two or more of these.

4. The method of claim 1 wherein the first and second seismic cables are part of a marine seismic spread comprising a plurality of seismic streamer cables, and each streamer cable comprises a plurality of nodes.

5. The method of claim 3 wherein the nodes lay in a plane that is substantially vertical and perpendicular to a longitudinal axis of the second seismic cable, and the angle of rotation is in the plane.

6. The method of claim 1 comprising recording signal transmissions at orthogonally situated seismic instruments in the second seismic cable to determine an angle of rotation of the second seismic cable.

7. The method of claim 5 wherein differences in phase measured at the nodes give their relation to one another with regard to orientation of the plane.

8. The method of claim 1 comprising using techniques selected from continuously counting cycles of the signal, continuously phase tracking the signal, determining cycle ambiguity using a plurality of signals to ensure high resolution and accuracy, and combinations thereof.

9. The method of claim 1 comprising using one or more signal processing techniques to estimate the one or more orientation parameters of the second seismic cable.

10. The method of claim 1 comprising using difference in signal arrival times at each node combined with monitoring of signal phase change to estimate the one or more orientation parameters of a plane when relative positions of nodes in the plane are known.

11. The method of claim 1 wherein the estimating is performed by a calculation performed by a computer and one or more software algorithms.

12. The method of claim 1 comprising using the estimate to deghost seismic data obtained using seismic instruments.

13. A method of estimating one or more orientation parameters of a marine seismic cable comprising:
   a) initiating an acoustic signal from a signal transmitter in a first seismic streamer cable, the signal impinging upon at least two nodes on or in one or more second seismic streamer cables, the nodes separated by a fixed distance;
   b) measuring a first and a second difference in arrival times at the nodes for the signal; and
   c) using change in the second difference from the first difference to estimate one or more orientation parameters of at least a portion of the second seismic streamer cables.

14. The method of claim 13 comprising recording transmissions at orthogonally situated nodes to determine an angle of rotation.

15. The method of claim 13 comprising continuously counting cycles and phase tracking of the signal.

16. The method of claim 13 wherein the estimate of the one or more orientation parameters comprises estimating parameters selected from an angle of rotation, inline heading, local sound velocity, and two or more of these.

17. A system for estimating one or more orientation parameters of a marine seismic cable comprising:
   a) two or more nodes separated by a fixed distance in a first seismic cable;
   b) a transmitter in a second seismic cable emitting an acoustic signal;
   c) a measuring unit for measuring a first and a second difference in arrival times at the nodes for the signal; and
   d) a calculation unit using change in the second difference from the first difference to estimate one or more orientation parameters of at least a portion of the first seismic cable.

18. The system of claim 17 comprising a deghosting subunit that receives streamer orientation data from the calculation unit.

19. The system of claim 17 wherein the first seismic cable comprises a plurality of seismic streamer cables, each streamer cable comprising a plurality of seismic instruments.

20. The system of claim 17 comprising a unit for measuring system parameters and transmitting at least some of the parameters to the calculation unit.

* * * * *